(12) United States Patent
Niimi et al.

(10) Patent No.: US 11,292,318 B2
(45) Date of Patent: Apr. 5, 2022

(54) VEHICLE AIR-CONDITIONING APPARATUS

(71) Applicant: DENSO CORPORATION, Kariya (JP)

(72) Inventors: Yasuhiko Niimi, Kariya (JP); Yuuka Tashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 559 days.

(21) Appl. No.: 16/317,851

(22) PCT Filed: May 31, 2017

(86) PCT No.: PCT/JP2017/020243
§ 371 (c)(1),
(2) Date: Jan. 15, 2019

(87) PCT Pub. No.: WO2018/016196
PCT Pub. Date: Jan. 25, 2018

(65) Prior Publication Data
US 2021/0276400 A1 Sep. 9, 2021

(51) Int. Cl.
*B60H 1/34* (2006.01)
*B60N 2/56* (2006.01)

(52) U.S. Cl.
CPC ......... *B60H 1/3421* (2013.01); *B60N 2/5628* (2013.01)

(58) Field of Classification Search
CPC .......... B60H 1/3421; B60H 2001/3464; B60H 2001/003; B60H 1/3414; B60H 1/00285; B60N 2/5628; B60N 2/5642; B60N 2/5657
USPC ....... 454/108, 109, 115, 120, 143, 155, 162, 454/313
See application file for complete search history.

(56) References Cited

U.S. PATENT DOCUMENTS

| 9,409,461 | B2 * | 8/2016 | Wang ................. B60H 1/00871 |
| 2005/0067140 | A1 * | 3/2005 | Sogame ................. B60H 1/242 165/42 |
| 2005/0087325 | A1 | 4/2005 | Roland et al. |
| 2008/0168787 | A1 | 7/2008 | Kameyama |
| 2010/0011799 | A1 * | 1/2010 | Sakakibara ............. F24F 13/06 62/426 |
| 2010/0314071 | A1 | 12/2010 | Lee et al. |
| 2012/0129439 | A1 | 5/2012 | Ota et al. |

(Continued)

FOREIGN PATENT DOCUMENTS

| DE | 102016107227 A1 * | 10/2017 | ........... B60H 1/3414 |
| EP | 2881272 A1 * | 6/2015 | ............. F24F 13/14 |

(Continued)

*Primary Examiner* — Avinash A Savani
*Assistant Examiner* — Dana K Tighe
(74) *Attorney, Agent, or Firm* — Harness, Dickey & Pierce, P.L.C.

(57) ABSTRACT

A vehicle air-conditioning apparatus includes: a duct disposed in a seat of a vehicle, air flowing through the duct from an air conditioning unit; a rear seat outlet formed on a back face of a backrest portion of the seat to blow out the air from the duct toward a rear seat of the vehicle; and an air flow deflection member that partitions the rear seat outlet into a first region and a second region to define a first passage through which the air flows from the duct through the first region in a first direction in a vehicle cabin and a second passage through which the air flows from the duct through the second region in a second direction more downward than the first direction in the vehicle cabin.

14 Claims, 8 Drawing Sheets

(56) References Cited

U.S. PATENT DOCUMENTS

| | | | |
|---|---|---|---|
| 2013/0178141 A1* | 7/2013 | Hoke | B60H 1/3414 |
| | | | 454/141 |
| 2015/0140915 A1 | 5/2015 | Rawlinson | |
| 2015/0266404 A1 | 9/2015 | Sakane et al. | |
| 2016/0121852 A1* | 5/2016 | Yoshimura | B60H 1/242 |
| | | | 454/127 |
| 2018/0117987 A1 | 5/2018 | Yamaoka et al. | |
| 2018/0134120 A1* | 5/2018 | Marginean | B60H 1/242 |

FOREIGN PATENT DOCUMENTS

| | | |
|---|---|---|
| JP | S57113214 U | 7/1982 |
| JP | S58194616 A | 11/1983 |
| JP | S60054618 U | 4/1985 |
| JP | S60081112 | 6/1985 |
| JP | S60234017 A | 11/1985 |
| JP | H05139143 A | 6/1993 |
| JP | H07025226 A | 1/1995 |
| JP | H07246131 A | 9/1995 |
| JP | H08175157 A | 7/1996 |
| JP | 2000233629 A | 8/2000 |
| JP | 2005126063 A | 5/2005 |
| JP | 2007008390 A | 1/2007 |
| JP | 2007186152 A | 7/2007 |
| JP | 2008168769 A | 7/2008 |
| JP | 2008-302793 A | 12/2008 |
| JP | 2012111318 A | 6/2012 |
| JP | 2014111424 A | 6/2014 |
| JP | 2015089467 A | 5/2015 |
| JP | 2015098318 A | 5/2015 |
| WO | WO-2016158472 A1 | 10/2016 |

\* cited by examiner

VEHICLE AIR-CONDITIONING APPARATUS

CROSS REFERENCE TO RELATED APPLICATIONS

This application is a U.S. National Phase Application under 35 U.S.C. 371 of International Application No. PCT/JP2017/020243 filed on May 31, 2017. This application is based on and claims the benefit of priority from Japanese Patent Application No. 2016-141519 filed on Jul. 19, 2016. The entire disclosures of all of the above applications are incorporated herein by reference.

TECHNICAL FIELD

The present disclosure relates to a vehicle air-conditioning apparatus.

BACKGROUND ART

Conventionally, a seat air-conditioner for a vehicle is described in Patent Document 1. The seat air-conditioner has a rear seat outlet on a rear side of a seat back of a driver's seat. Air-conditioned wind sent through a duct provided inside the seat back of the driver's seat is guided to blow out to the rear seat from the rear seat outlet provided on the back face of the seat back of the driver's seat.

PRIOR ART LITERATURES

Patent Document

Patent Document 1: JP 2007-186152 A

SUMMARY

According to the study of the inventors, the device described in Patent Document 1 simply blows conditioned-air toward an upper body of an occupant on the rear seat from the rear seat outlet provided on the seat back of the driver's seat. So it is difficult to sufficiently satisfy the comfort of the occupant.

The present disclosure aims to improve the comfort of an occupant.

According to an aspect of the present disclosure, a vehicle air-conditioning apparatus includes: an air conditioning unit configured to send air conditioned in temperature; a duct disposed in a seat of a vehicle, the air flowing through the duct from the air conditioning unit; a rear seat outlet formed on a back face of a backrest portion of the seat of the vehicle to blow out the air from the duct toward a rear seat of the vehicle; and an air flow deflection member that partitions the rear seat outlet into an upper first region and a lower second region to define a first passage through which the air flows from the duct through the first region in a first direction in a vehicle cabin and a second passage through which the air flows from the duct through the second region in a second direction more downward than the first direction in the vehicle cabin. The air flow deflection member causes a flow of the air flowing out of the first region through the first passage and a flow of the air flowing out of the second region through the second passage in a switching manner.

Accordingly, the air flow deflection member divides the rear seat outlet into the upper first region and the lower second region. The first passage allows air from the duct to flow out through the first region in the first direction, and the second passage allows the air from the duct to flow out through the second region in the second direction more downward than the first direction inside the vehicle cabin. The flow of the air flowing out of the first region through the first passage and the flow of the air flowing out of the second region through the second passage are switched from each other. For this reason, for example, air can be blown out from the first area to an upper body of an occupant on the rear seat through the first passage, and air can be blown out from the second area to a lower body of the occupant lower than the upper body through the second passage. Thus, the comfort of the occupant can be improved.

It is to be noted that reference numerals in parentheses of each element in the appended claims indicate correspondence relationships with specific elements described in embodiments to be described later.

DESCRIPTION OF EMBODIMENTS

Figure 1:
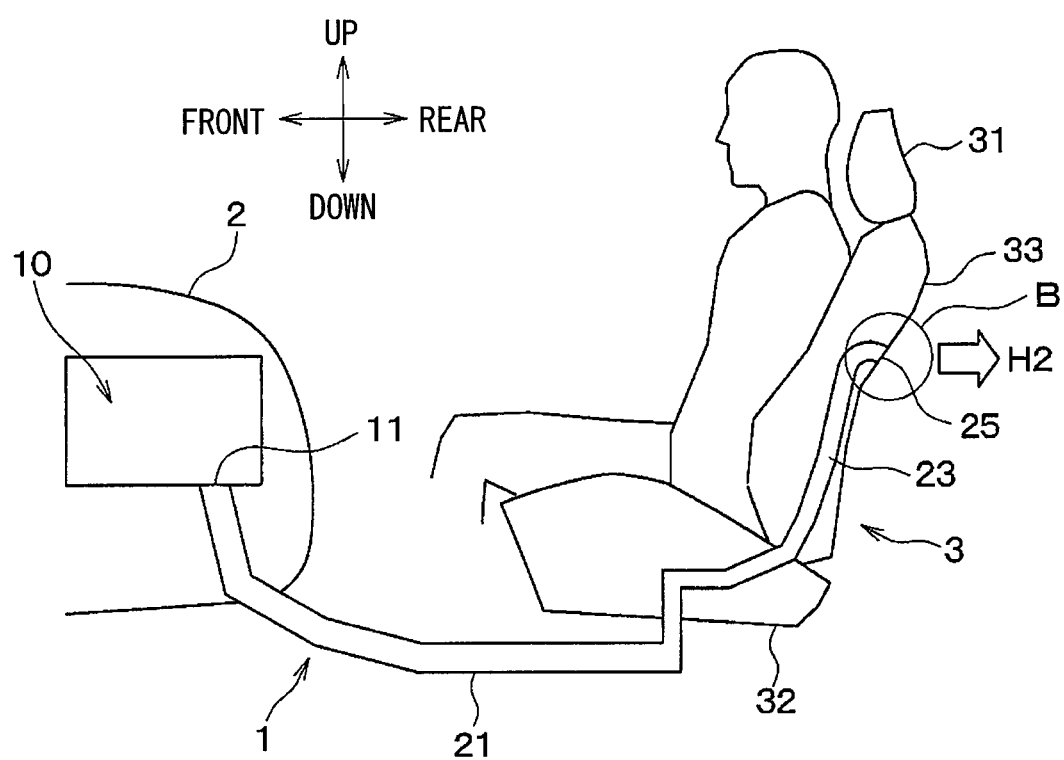
FIG. 1 is a schematic view illustrating a configuration of a vehicle air-conditioning apparatus according to a first embodiment, in which a first air flow deflection member closes a second passage.

The following describes several embodiments with reference to the drawings. In the following embodiments, the same or equivalent parts are denoted by the same reference numerals as each other, and explanations will be provided to the same reference numerals for simplifying descriptions.

First Embodiment

An air conditioning apparatus 1 for a vehicle in a first embodiment will be described hereafter with reference to FIG. 1 to FIG. 8. FIG. 1 is a schematic configuration diagram illustrating a vehicle air-conditioning apparatus of the present embodiment. Orientation indicators showing up-down, left-right and front-rear in the drawings respectively indicate an up-down direction, a left-right direction and a front-rear direction when the air conditioning apparatus is mounted to the vehicle. The air conditioning apparatus 1 includes an indoor air conditioning unit 10, a connection duct 21, a seat duct 23, and a rear seat outlet 25. The indoor air-conditioning unit 30 is disposed inside a meter (instrument panel) 2 at the foremost part in the vehicle cabin.

The indoor air conditioning unit 10 includes a blowing unit and a temperature adjustment unit, and is a well-known unit that blows conditioned air from plural openings. Specifically, the blower unit has a blower, and air in the cabin or air outside the cabin is introduced and blown out by driving the blower. It is possible to change the volume of the air blown out from the blowing unit according to the operation of the occupant. The temperature adjustment unit includes a cooling heat exchanger, a heating heat exchanger, an air mixing door, and the like, and controls the temperature of air blown from the blower unit through the plural openings as conditioned air.

The plural openings comprises a face blowout opening, a foot blowout opening, a defroster blowout opening, and the rear seat outlet 25.

The face blowout opening blows the conditioned air through a face duct to a face air outlet. The face air outlet blows the conditioned air to an upper body of an occupant on the front seat.

The foot blowout opening blows the conditioned air through a foot duct to a foot air outlet. The foot air outlet blows the conditioned air to a lower body of the occupant on the front seat.

The defroster blowout opening blows the conditioned air through a defroster duct to a defroster air outlet. The defroster air outlet blows the conditioned air to the inner surface of the windshield.

The face air outlet, the foot air outlet, and the defroster air outlet of the present embodiment provide the conditioned air for the front side of the vehicle cabin in the traveling direction. The face air outlet, the foot air outlet, and the defroster air outlet are formed in the instrument panel 2.

The rear seat outlet 25 of the present embodiment is formed in the front seat 3. The front seat 3 includes a headrest 31, a seat portion 32 and a backrest portion 33.

The headrest 31, the seat portion 32, and the backrest portion 33 are supported by a seat frame (not shown). The headrest 31 supports the head of the occupant. The seat portion 32 supports the thighs and buttocks of the occupant. The backrest portion 33 supports the back of the occupant. The seat portion 32 and the backrest portion 33 are made of urethane resin or the like.

The connection duct 21 connects the indoor air conditioning unit 10 to the seat duct 23 provided in the front seat 3. The connection duct 21 is a single duct arranged on the floor side in the cabin. The connection duct 21 introduces the conditioned air blown from the indoor air conditioning unit 10 to the seat duct 23.

The air inlet of the seat duct 23 is connected to the connection duct 21. Further, the air outlet of the seat duct 23 is connected to the rear seat outlet 25. The seat duct 23 is arranged in the seat portion 32 and the backrest portion 33 of the front seat 3. The seat duct 23 blows the conditioned air introduced from the connection duct 21 from the rear seat outlet 25.

The rear seat outlet 25 is connected to the indoor air conditioning unit 10 via the connection duct 21 and the seat duct 23. The rear seat outlet 25 is formed on the back side of the backrest portion 33 of the front seat 3, that is, on the rear side of the front seat 3 in the vehicle traveling direction, and is open toward the rear seat. The rear seat outlet 25 blows the conditioned air toward the occupant on the rear seat.

Figure 2:
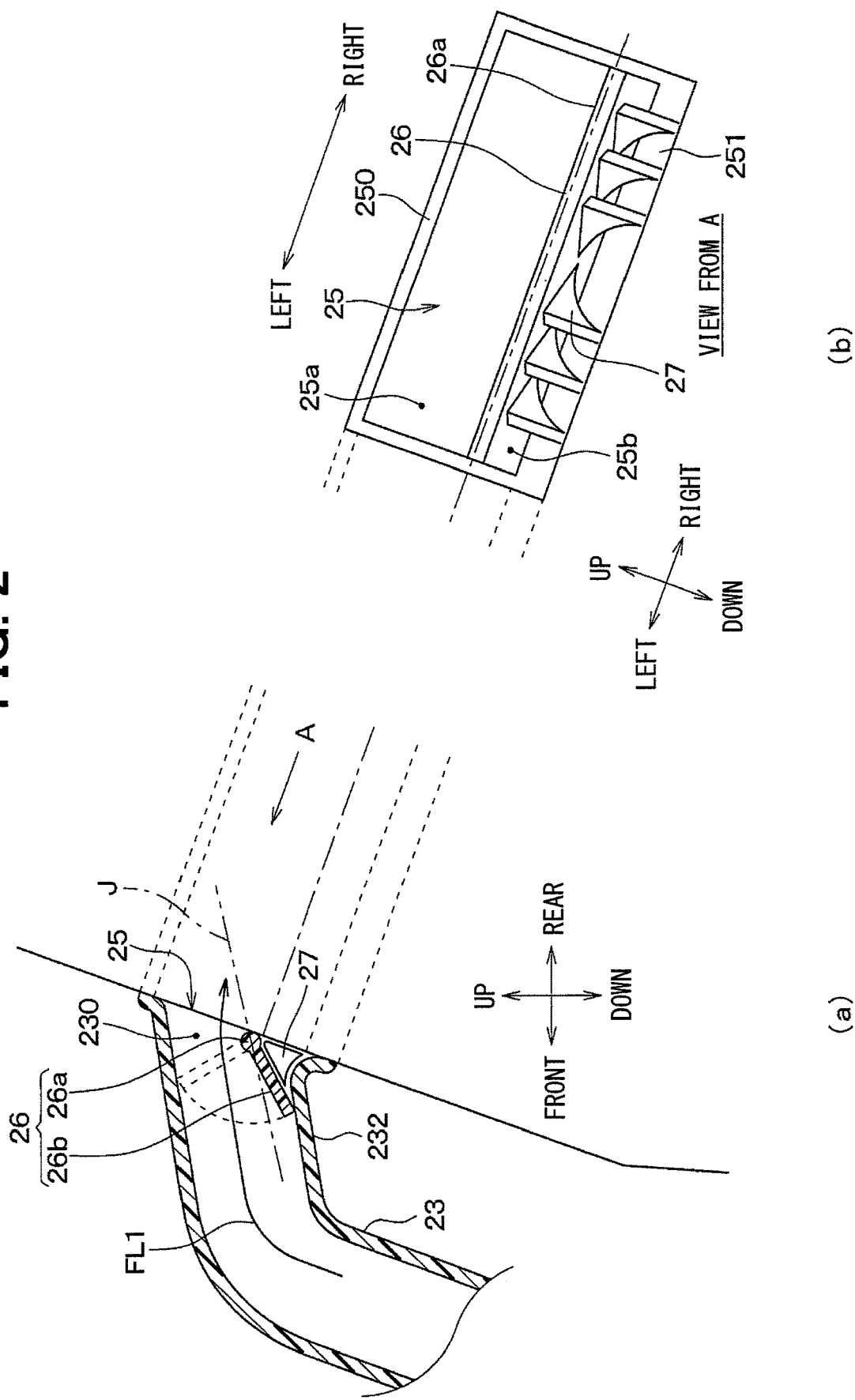
FIG. 2 illustrates (a) an enlarged view of a portion B in FIG. 1, and (b) a view seen in the arrow direction A in (a).

FIG. 2 is an enlarged view of the rear seat outlet 25, in which (a) is an enlarged view of a portion B in FIG. 1, and (b) is a view as seen from the arrow A in (a).

The rear seat outlet 25 is provided at a downstream end of the seat duct 23 in the air flow. The seat duct 23 has a linear approach section 232 extending along the axial line J in the downstream region of the seat duct 23 adjacent to the one end in the air flow. A first air flow deflection member 26 and a second air flow deflection member 27 are provided in the downstream region of the seat duct 23 adjacent to the one end in the air flow.

The first air flow deflection member 26 includes a door body 26b formed in a plate shape, and a rotation shaft 26a disposed downstream of the door body 26b in the air flow in the seat duct 23. The rotation shaft 26a is arranged along one side of the door body 26b in the plane direction. The rotation shaft 26a is located on the lower side in the rear seat outlet 25 than the center in the up-down direction, and is supported rotatably by both sides of the rear seat outlet 25 in the vehicle width direction of the vehicle. The door body 26b rotates around the rotation shaft 26a as a rotation center.

Figure 3:
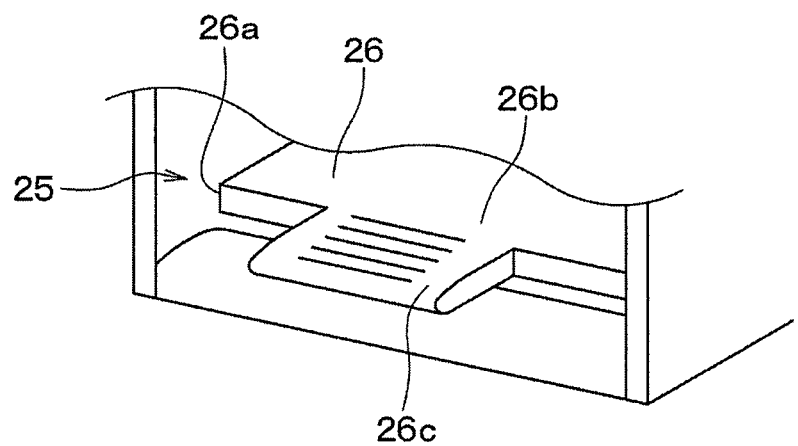
FIG. 3 is a diagram for explaining an operation portion.
Figure 4:
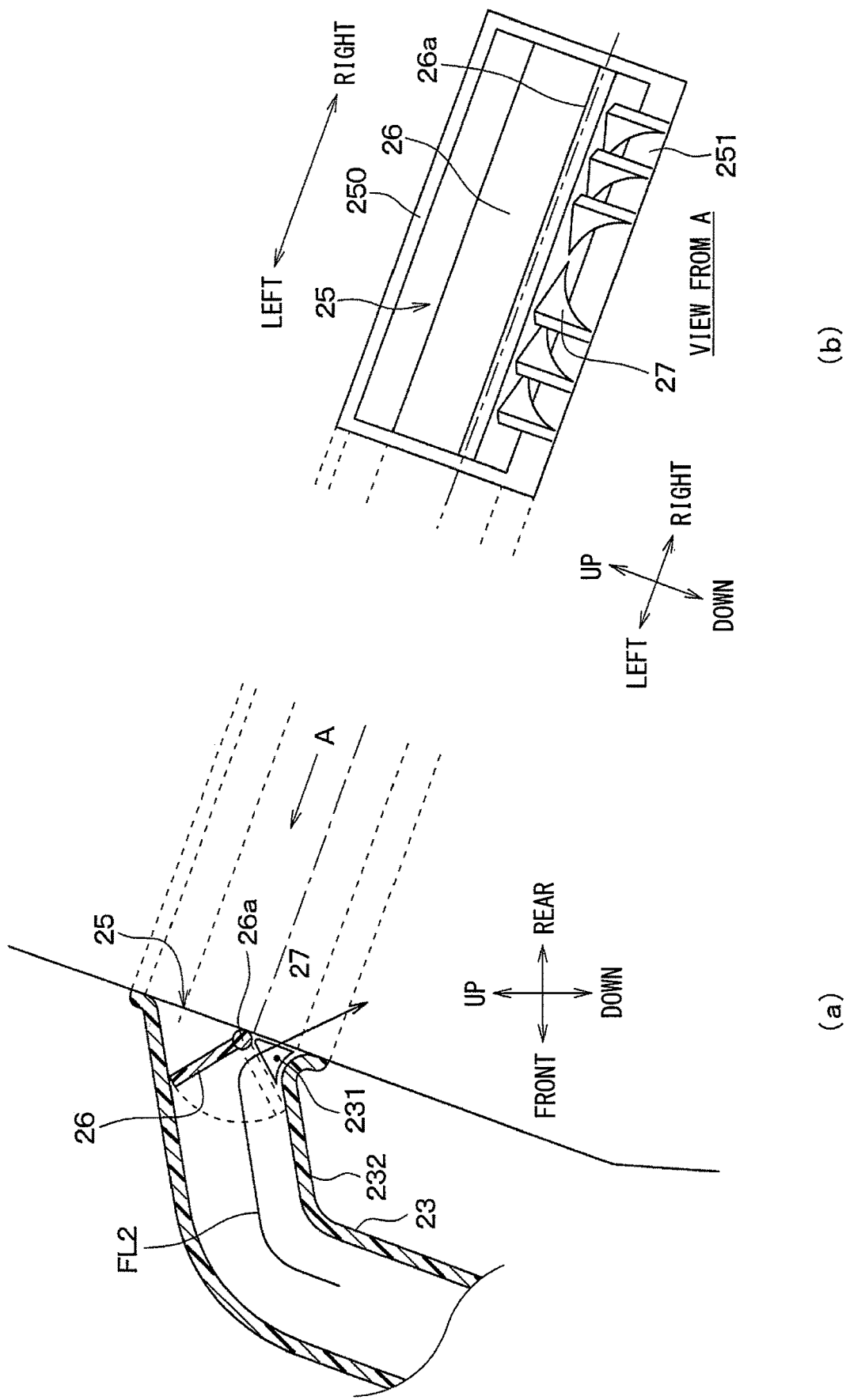
FIG. 4 is a view illustrating a state in which the first air flow deflection member closes a first passage.

Although not shown in FIGS. 2 and 4 to 9, the first air flow deflection member 26 has an operation portion 26c as shown in FIG. 3. The occupant can change the orientation of the door body 26b by moving the operation portion 26c up and down.

As shown in FIG. 2, the first air flow deflection member 26 is arranged to partition the rear seat outlet 25 into an upper first region 25a and a lower second region 25b. The first air flow deflection member 26 forms a first passage 230 shown in (a) of FIG. 2 and a second passage 231 shown in (a) of FIG. 4 according to the position of the door body 26b.

The first air flow deflection member 26 switches the flow of air flowing out from the first region 25a through the first passage 230 and the flow of air flowing out from the second region 25b through the second passage 231. The first air flow deflection member 26 can also change the ratio of the flow rate of air flowing through the first passage 230 to the flow rate of air flowing through the second passage 231.

The first air flow deflection member 26 is capable of closing one of the first passage 230 and the second passage 231. That is, the first air flow deflection member 26 can close the first passage 230 on one side of the door body 26b and close the second passage 231 on the other side of the door body 26b. It should be noted that closing the passage with the air flow deflection member does not mean that the passage is completely closed by the air flow deflection member.

The first passage 230 is a passage that allows the air from the seat duct 23 to flow out from the upper first region 25a of the rear seat outlet 25 in the first direction in the vehicle cabin. The second passage 231 is a passage that allows the air from the seat duct 23 to flow out from the lower second region 25b of the rear seat outlet 25 in the second direction more downward than the first direction.

When the second passage 231 is closed by the first air flow deflection member 26, the air is blown out from the upper first region 25a of the rear seat outlet 25 in the first direction. Specifically, the first direction is a direction of the conditioned wind in the face mode, to direct the conditioned wind toward the upper body including the face of the occupant on the rear seat.

When the first passage 230 is closed by the first air flow deflection member 26, the air is blown out from the lower second region 25b of the rear seat outlet 25 in the second direction. Specifically, the second direction is a direction of the conditioned wind in the foot mode, to direct the conditioned wind toward the lower body including both knees of the occupant on the rear seat.

Figure 5:
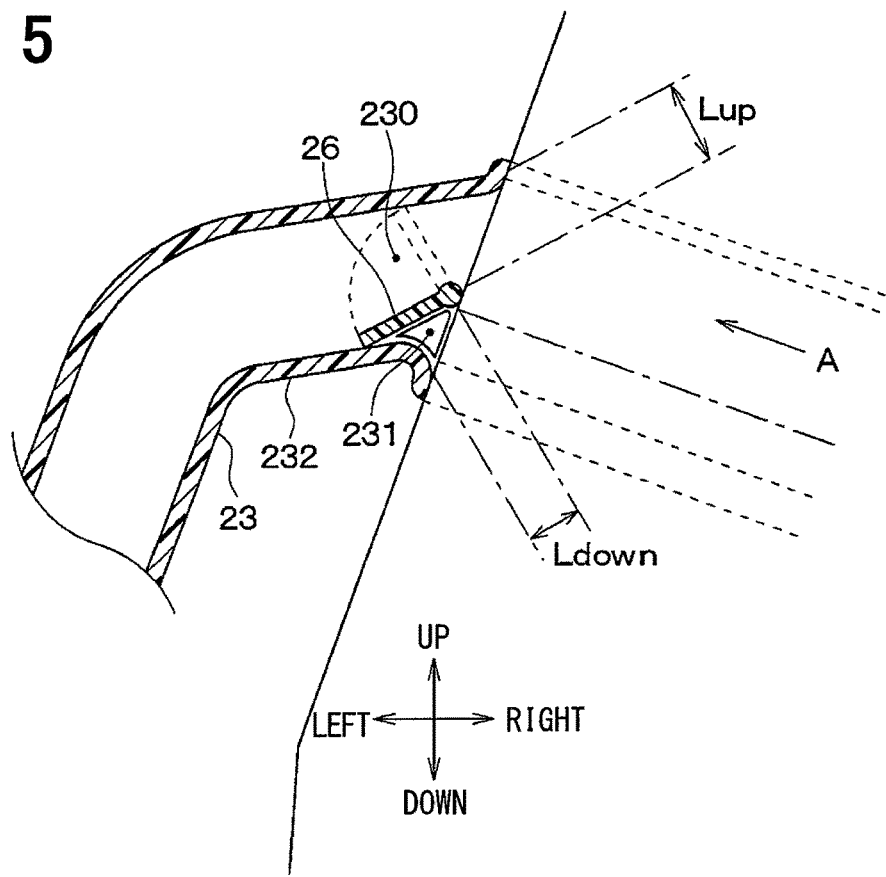
FIG. 5 is a view for explaining an orientation of an approach section.

As shown in FIG. 5, the height Lup of the first passage 230 when the second passage 231 is closed by the first air flow deflection member 26 is larger than the height Ldown of the second passage 231 when the first passage 230 is closed by the first air flow deflection member 26. The passage cross-sectional area of the first passage 230 to the rear seat outlet 25 is larger than the passage cross-sectional area of the second passage 231 to the rear seat outlet 25.

Figure 6:
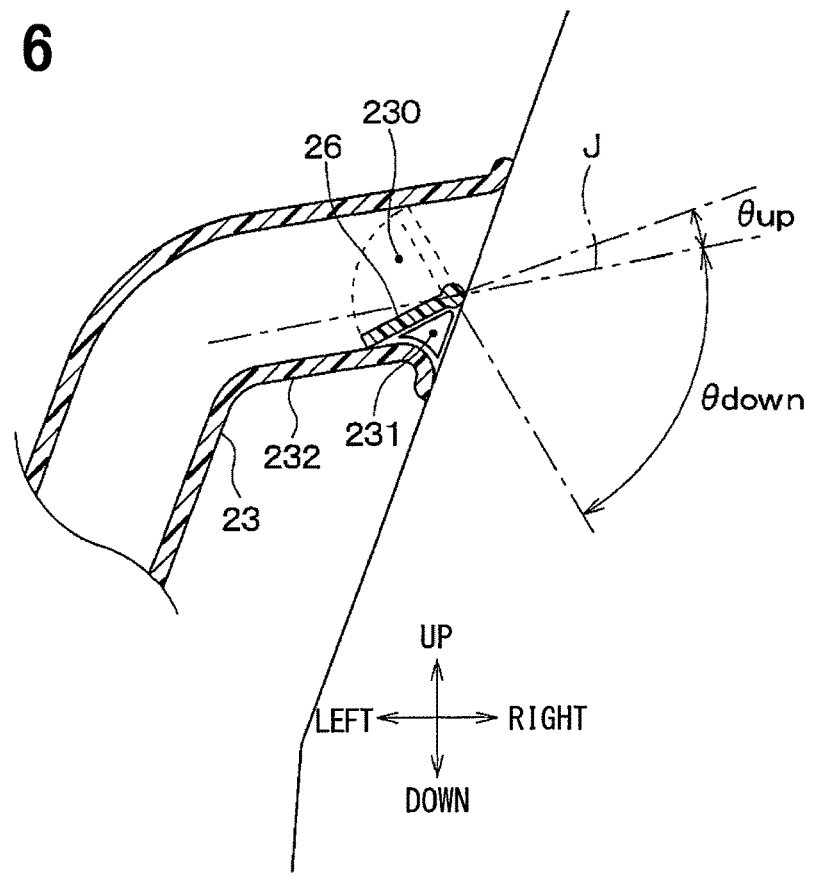
FIG. 6 is a view for explaining an angle of the first air flow deflection member.

As shown in FIG. 6, the seat duct 23 has the approach section 232 extending along the axial line J in the downstream region of the seat duct 23 adjacent to the one end in the air flow. The angle θdown formed between the axial line J and the door body 26*b* when the first passage 230 is closed by the one side of the door body 26*b* is larger than the angle θup formed between the axial line J and the door body 26*b* when the second passage 231 is closed by the other side of the door body 26*b*.

In other words, the deflection of the air flow and the pressure loss due to the door body 26*b* are larger in the foot mode in which the first passage 230 is closed by the one side of the door body 26*b* than in the face mode in which the second passage 231 is closed by the other side of the door body 26*b*.

Therefore, the wind speed of the air blown out from the upper first region 25*a* of the rear seat outlet 25 in the face mode in which the second passage 231 is closed by the first air flow deflection member 26 is faster than the wind speed of the air blown out from the lower second region 25*b* of the rear seat outlet 25 in the foot mode in which the first passage 230 is closed by the first air flow deflection member 26.

Figure 7:
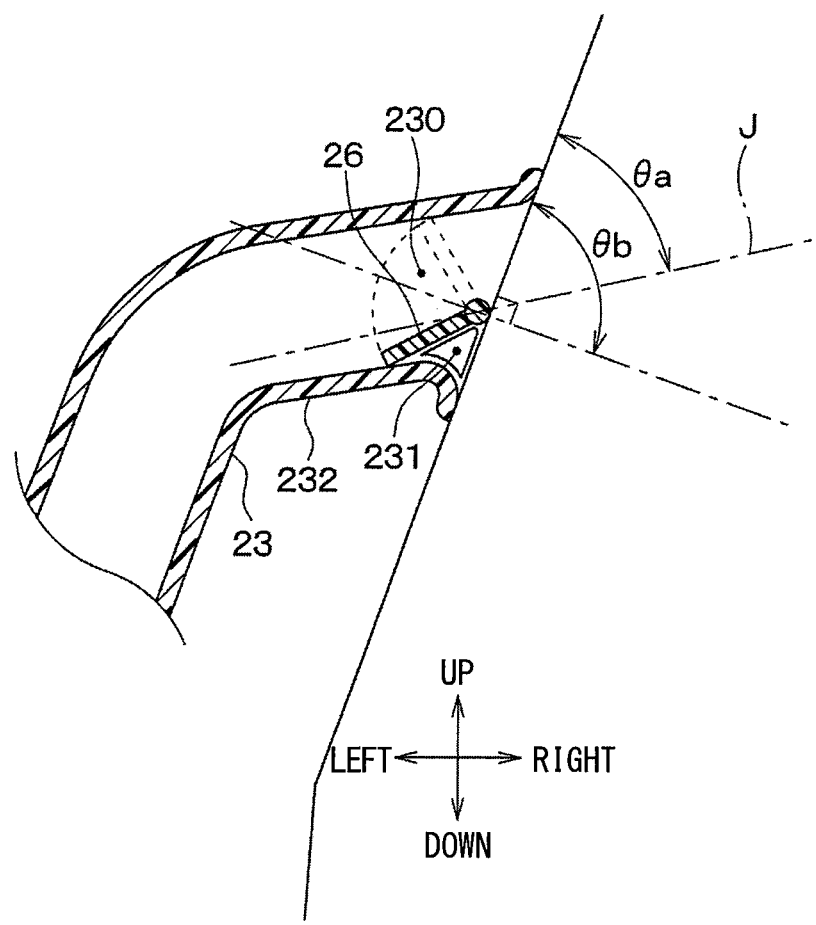
FIG. 7 is a view for explaining an open area of the first passage and an open area of the second passage.

As shown in FIG. 7, the seat duct 23 is formed such that the direction of the axial line J from the upstream side to the downstream side in the seat duct 23 is oriented more upward than the normal direction of the open plane of the rear seat outlet 25. When the angle formed between the open plane of the rear seat outlet 25 and the axial line J is defined as θa and when the angle formed between the open plane of the rear seat outlet 25 and the normal line of the open plane is set to θb=90°, the relationship of θa>θb is satisfied.

That is, since the approach section 232 of the seat duct 23 extends obliquely upward relative to the normal direction of the open plane of the rear seat outlet 25, air is blown obliquely upward from the upper first region 25*a* of the rear seat outlet 25 in the face mode where the second passage 231 is closed by the first air flow deflection member 26.

In addition, the deflection of the air flow is smaller in the face mode where the second passage 231 is closed by the other side of the door body 26*b* than in the foot mode where the first passage 230 is closed by the one side of the door body 26*b*, such that the ventilation resistance can be reduced in the face mode.

Furthermore, since the passage cross-sectional area of the first passage 230 to the rear seat outlet 25 is larger than the open area of the second passage 231 to the rear seat outlet 25, the ventilation resistance can be reduced in the face mode.

As described above, it is possible to blow out a large amount of the conditioned air toward the occupant's face in the face mode that is mainly used in summer.

Figure 8:
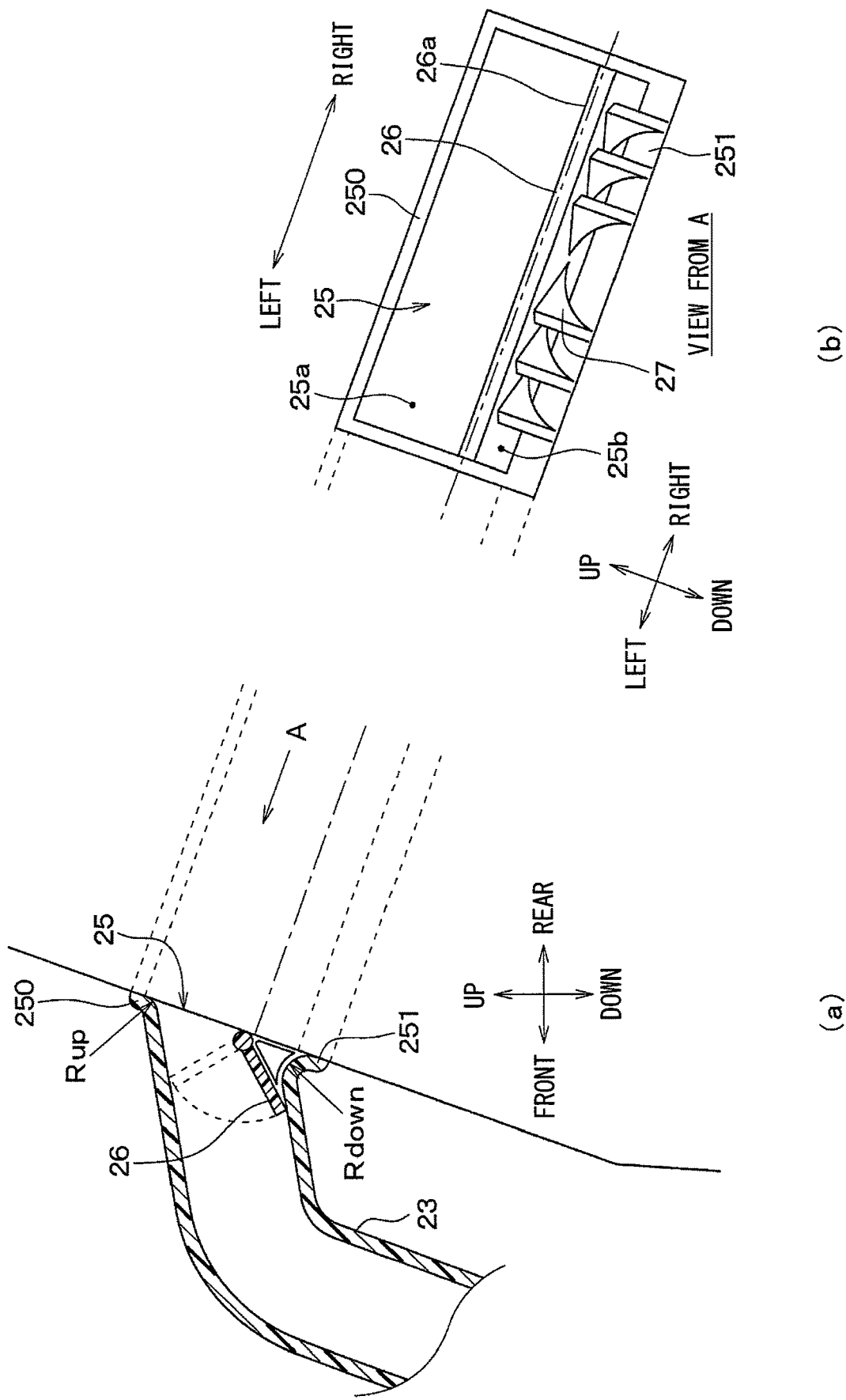
FIG. 8 is a view for explaining a radius of curvature of an upper opening edge portion and a lower opening edge portion of a rear seat outlet.

As shown in FIG. 8, an upper opening edge portion 250 of the rear seat outlet 25 and a lower opening edge portion 251 of the rear seat outlet 25 are formed in a curved shape in the cross section perpendicular to the vehicle width direction. Therefore, it is possible to ensure safety when an occupant touches the upper opening edge portion 250 of the rear seat outlet 25 and the lower opening edge portion 251 of the rear seat outlet 25.

The radius of curvature Rdown of the lower opening edge portion 251 of the rear seat outlet 25 is larger than the radius of curvature Rup of the upper opening edge portion 250 of the rear seat outlet 25. As the radius of curvature of the opening edge portion 250, 251 is larger, the air flow does not separate from the wall surface and flows along the wall surface, so the air flow tends to deflect.

Therefore, in the foot mode, the air flow blown out from the lower second region 25*b* of the rear seat outlet 25 can be deflected greatly to the occupant's knee by increasing the radius of curvature Rdown of the lower opening edge portion 251 of the rear seat outlet 25.

In addition, in the face mode, the air flow blown out from the first region 25*a* of the rear seat outlet 25 can be separated from the wall surface and directed to the face of the occupant by reducing the radius of curvature Rup of the upper opening edge 250 of the rear seat outlet 25. Further, the designability can be raised.

In the foot mode that is mainly used in winter, it is an issue to increase the stove ratio. The stove ratio is expressed as a value dividing the heating capacity by the air volume. That is, in the foot mode, in order to increase the stove ratio, it is important to reduce the amount of air blown out from the rear seat outlet 25.

However, in order to stably operate the blower provided in the air blowing unit, it is necessary to operate at a rotation speed higher than or equal to a predetermined minimum rotation number. When the blower is operated at the minimum rotation number, the constant volume of air is blown out from the rear seat outlet 25.

According to the vehicle air-conditioning apparatus of the present embodiment, as described above, since the pressure loss is larger in the foot mode than in the face mode, the stove ratio can be increased as compared with a case, for example, where the pressure loss is the same between in the foot mode and in the face mode.

As shown in (b) of FIG. 2, a second air flow deflection member 27 is provided in the second passage 231 in the rear seat outlet 25, and diffuses the air blown from the rear seat outlet 25 in the vehicle width direction. The second air flow deflection member 27 corresponds to an air diffusing member.

The second air flow deflection member 27 includes plural ribs projected from the bottom wall surface of the second passage 231 toward the second passage 231.

The air blown out from the second passage 231 through the second region 25*b* of the rear seat outlet 25 can spread in the vehicle width direction of the vehicle due to the second air flow deflection member 27. Therefore, even when an occupant is seated on the front seat 3 with his legs separated from each other, it is possible to direct the air flow to both knees of the occupant. Further, since the ventilation resistance is increased by the second passage 231, the stove ratio can be increased as compared with a case where the second passage 231 is not provided.

According to the configuration described above, the rear seat outlet 25 is divided into the upper first region 25*a* and the lower second region 25*b* by the first air flow deflection member 26. The air from the seat duct 23 flows through the first passage 230 and the first region 25*a* in the first direction into the vehicle cabin, and the air from the seat duct 23 flows through the second passage 231 and the second region 25*b* in the second direction more downward than the first direction into the vehicle cabin. The first air flow deflection member 26 switches the flow of air flowing out from the first region 25*a* through the first passage 230 and the flow of air flowing out from the second region 25*b* through the second passage 231 from each other. For this reason, for example, air can be blown out through the first passage 230 from the first region 25*a* toward an upper body of an occupant on the rear seat, or can be blown out through the second passage 231 from the second region 25*b* more downward than the upper body of the occupant on the rear seat. Thus, the comfort of the occupant can be improved.

Further, even when the rotational speed of the blower provided in the blower unit is constant, the wind speed, the wind direction, and the width of the air blown out from the rear seat outlet can be changed by the first air flow deflection member.

Further, the first air flow deflection member 26 closes either the first passage 230 or the second passage 231. The wind speed of the air blown out from the first passage 230 when the second passage 231 is closed by the first air flow deflection member 26 is higher than that of the air blown out from the second passage 231 when the first passage 230 is closed by the air flow deflection member 26.

Accordingly, the air with a higher speed can be blown out from the first passage 230 in the first direction into the vehicle cabin, and the air with a lower speed can be blown out from the second passage 231 in the second direction more downward than the first direction into the vehicle cabin.

The seat duct 23 has the approach section 232 extending along the axial line J in the downstream region of the seat duct 23 adjacent to the one end in the air flow. The first air flow deflection member 26 includes the door body 26b formed in a plate shape and the rotation shaft 26a disposed downstream of the door body 26b, adjacent to the one end in the air flow in the seat duct 23. The rotation shaft 26a is arranged along the door body 26b in the plane direction. The first passage 230 is closed by the one side of the door body 26b and the second passage 231 is closed by the other side of the door body 26b. The angle θdown formed between the axial line J and the door body 26b when the first passage is closed by the one side of the door body 26b is larger than the angle θup formed between the axial line J and the door body 26b when the second passage 231 is closed by the other side of the door body 26b.

Accordingly, the deflection of the air flow and the pressure loss due to the door body 26b are increased in the foot mode where the first passage 230 is closed by the one side of the door body 26b than in the foot mode where the second passage 231 is closed by the other side of the door body 26b.

Therefore, the wind speed of the air blown from the upper first region 25a of the rear seat outlet 25 in the face mode where the first air flow deflection member 26 closes the second passage 231 can be made faster than the wind speed of the air blown out from the lower second region 25b of the rear seat outlet 25 in the foot mode where the first passage 230 is closed by the first air flow deflection member 26.

The passage cross-sectional area of the first passage 230 to the rear seat outlet 25 is larger than the passage cross-sectional area of the second passage 231 to the rear seat outlet 25. Therefore, it is possible to reduce the pressure loss in the first passage 230 as compared with a case where the passage sectional area is the same between the first passage 230 and the second passage 231 in the rear seat outlet 25.

The upper opening edge portion 250 of the rear seat outlet 25 and the lower opening edge portion 251 of the rear seat outlet have curved shape in the cross-section perpendicular to the vehicle width direction. The radius of curvature Rdown of the lower opening edge portion 251 of the rear seat outlet 25 is larger than the radius of curvature Rup of the upper opening edge portion 250 of the rear seat outlet 25.

Accordingly, it is possible to greatly deflect the air flow blown out from the second region 25b of the rear seat outlet 25 in the foot mode where the first passage 230 is closed by the first air flow deflection member 26.

Further, the air flow blown from the first region 25a of the rear seat outlet 25 can be separated from the wall surface and directed toward the occupant in the face mode where the second passage 231 is closed by the first air flow deflection member 26. Moreover, the design can be improved.

Further, the seat duct 23 has the approach section 232 extending along the axial line J in the downstream region of the seat duct 23 in the air flow, and is formed such that the axial line from the upstream side to the downstream side in the seat duct 23 extends upward than the direction of the normal line of the open plane of the rear seat outlet 25. Accordingly, it is possible to blow air upward from the rear seat outlet 25 than the normal direction of the open plane of the rear seat outlet 25.

The air diffusing member 27, 28 is provided for diffusing the air blown out from the second passage 231 in the vehicle width direction than the air blown out from the first passage 230. Accordingly, the air blown out from the second passage 231 can be diffused in the vehicle width direction of the vehicle than the air blown out from the first passage 230.

The second air flow deflection member 27 is disposed in the second passage 231 of the rear seat outlet 25, and diffuses the air blown from the rear seat outlet 25 in the vehicle width direction. Accordingly, it is possible to diffuse the air blown out from the second region 25b of the rear seat outlet 25 in the vehicle width direction of the vehicle.

Second Embodiment

Figure 9:
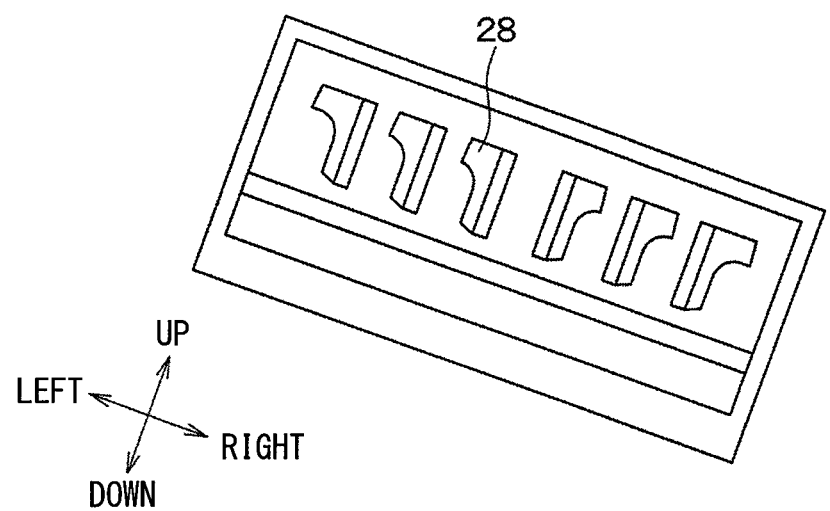
FIG. 9 is a view for explaining a modification, in which a third air flow deflection member is provided in a rear seat outlet.

The vehicle air-conditioning apparatus 1 according to a second embodiment will be described with reference to FIG. 9. In the first embodiment, the second air flow deflection member 27 for diffusing the air blown from the rear seat outlet 25 in the vehicle width direction is provided in the second passage 231 in the rear seat outlet 25. In contrast, as shown in FIG. 9, the air-conditioning apparatus 1 according to the present embodiment has a third air flow deflection member 28 disposed in the first passage 230 in the rear seat outlet 25, for concentrating air blown from the rear seat outlet 25 to the center in the vehicle width direction of the vehicle. The third air flow deflection member 28 corresponds to an air diffusing member.

The third air flow deflection member 28 includes plural ribs projected from the top wall surface of the first passage 230 toward the first passage 230. The air blown out from the first passage 230 through the first region 25a of the rear seat outlet 25 is concentrated by the third air flow deflection member 28 to the center in the vehicle width direction of the vehicle.

In this manner, the third air flow deflection member 28 is disposed in the first passage 230 at the rear seat outlet, and concentrates the air blown from the rear seat outlet 25 to the center in the vehicle width direction of the vehicle. Accordingly, it is possible to concentrate the air blown out from the first passage 230 through the first region 25a of the rear seat outlet 25 to the center in the vehicle width direction of the vehicle, for example, toward the occupant's face.

The present embodiment can achieve the effects and advantages, which are obtained from the common structure common to the first embodiment.

Other Embodiment (1) In each of the embodiments, the wind speed of the air blown out from the first passage when the second passage is closed by the first air flow deflection member is higher than the wind speed of the air blown out from the second passage when the first passage is closed by the air flow deflection member. Alternatively, the wind speed of the air blown out from the first passage when the second passage is closed by the first air flow deflection member may be lower than the wind speed of the air blown out from the second passage when the first passage is closed by the air flow deflection member.

(2) In each of the embodiments, the angle θdown formed between the axial line and the door body when the first passage is closed by the one side of the door body is larger than the angle θup formed between the axial line and the door body when the second passage is closed by the other side of the door body. Alternatively, the angle θdown formed between the axial line and the door body when the first passage is closed by the one side of the door body may be smaller than the angle θup formed between the axial line and the door body when the second passage is closed by the other side of the door body.

(3) In each of the embodiments, the angle θdown formed between the axial line and the door body when the first passage is closed by the one side of the door body is larger than the angle θup formed between the axial line and the door body when the second passage is closed by the other side of the door body. Alternatively, the angle θdown formed between the axial line and the door body when the first passage is closed by the one side of the door body may be smaller than the angle θup formed between the axial line and the door body when the second passage is closed by the other side of the door body.

(4) In each of the embodiments, the passage cross-sectional area of the first passage to the rear seat outlet is larger than the passage cross-sectional area of the second passage to the rear seat outlet. Alternatively, the passage cross-sectional area of the first passage to the rear seat outlet may be smaller than the passage cross-sectional area of the second passage to the rear seat outlet.

(5) In the first embodiment, the second air flow deflection member 27 for diffusing the air blown from the rear seat outlet in the vehicle width direction is provided in the second passage at the rear seat outlet. In the second embodiment, the third air flow deflection member 28 for concentrating the air blown from the rear seat outlet to the center in the vehicle width direction is provided in the first passage at the rear seat outlet.

Alternatively, the second air flow deflection member 27 may be provided in the second passage at the rear seat outlet, and the third air flow deflection member 28 may be provided in the first passage at the rear seat outlet.

It should be appreciated that the present disclosure is not limited to the embodiments described above and can be modified appropriately. The embodiments above are not irrelevant to one another and can be combined appropriately unless a combination is obviously impossible. In the respective embodiments above, it goes without saying that elements forming the embodiments are not necessarily essential unless specified as being essential or deemed as being apparently essential in principle. In a case where a reference is made to the components of the respective embodiments as to numerical values, such as the number, values, amounts, and ranges, the components are not limited to the numerical values unless specified as being essential or deemed as being apparently essential in principle. Also, in a case where a reference is made to the components of the respective embodiments above as to shapes and positional relations, the components are not limited to the shapes and the positional relations unless explicitly specified or limited to particular shapes and positional relations in principle.

CONCLUSION

According to a first aspect represented by a part or all of the above embodiments, a vehicle air-conditioning apparatus includes: an air conditioning unit configured to send air conditioned in temperature; and a duct disposed in a seat of a vehicle, the air flowing through the duct from the air conditioning unit. The air-conditioning apparatus further includes: a rear seat outlet formed on a back face of a backrest portion of the seat of the vehicle to blow out the air from the duct toward a rear seat of the vehicle; and an air flow deflection member that partitions the rear seat outlet into an upper first region and a lower second region to define a first passage through which the air flows from the duct through the first region in a first direction in a vehicle cabin and a second passage through which the air flows from the duct through the second region in a second direction more downward than the first direction in the vehicle cabin. The air flow deflection member causes a flow of the air flowing out of the first region through the first passage and a flow of the air flowing out of the second region through the second passage in a switching manner.

According to a second aspect, the air flow deflection member closes one of the first passage and the second passage. A wind speed of the air blown out from the first passage when the second passage is closed by the air flow deflection member is higher than a wind speed of the air blown out from the second passage when the first passage is closed by the air flow deflection member.

Accordingly, it is possible to blow out air with a higher wind speed from the first passage in the first direction into the vehicle cabin, and air with a lower wind speed from the second passage in the second direction more downward than the first direction into the vehicle cabin.

According to a third aspect, the duct has a section extending along an axial line J in a region adjacent to a downstream end of the duct in the air flow. The air flow deflection member comprises a door body formed in a plate shape, and a rotation shaft disposed downstream of the door body in the air flow in the duct and arranged along one side of the door body in a plane direction. The first passage is closed by one side of the door body, and the second passage is closed by the other side of the door body. An angle θdown defined between the axial line and the door body when the first passage is closed by the one side of the door body is larger than an angle θup defined between the axial line and the door body when the second passage is closed by the other side of the door body.

Accordingly, the deflection of the air flow and the pressure loss caused by the door body 26b can be made larger when the first passage 230 is closed by the one side of the door body 26b than when the second passage is closed by the other side of the door body.

Therefore, the wind speed of the air blown out from the first area of the rear seat outlet when the second passage is closed by the air flow deflection member can be made faster than the wind speed of the air blown out from the second region of the rear seat outlet when the first passage is closed by the first air flow deflection member.

According to the fourth aspect, a passage cross-sectional area of the first passage at the rear seat outlet is larger than a passage cross-sectional area of the second passage at the rear seat outlet. Accordingly, it is possible to reduce the ventilation resistance of air blown out through the first passage.

According to the fifth aspect, each of an upper opening edge portion of the rear seat outlet and a lower opening edge portion of the rear seat outlet is curved in a cross section perpendicular to a width direction of the vehicle. A radius of curvature Rdown of the lower opening edge portion of the rear seat outlet is larger than a radius of curvature Rup of the upper opening edge portion of the rear seat outlet.

Therefore, it is possible to ensure safety when an occupant touches the upper opening edge portion 250 of the rear seat outlet 25 and the lower opening edge portion 251 of the rear seat outlet 25. Furthermore, it is possible to greatly deflect the air blown out from the lower edge portion downward, compared with a case where the radius of curvature Rdown of the lower opening edge portion of the rear seat outlet and the radius of curvature Rup of the upper opening edge portion of the rear seat outlet are the same.

According to the sixth and seventh aspects, the duct has a section extending along an axial line J in a region adjacent to a downstream end of the duct in the air flow, and the axial line from an upstream side to a downstream side in the air flow in the duct is directed more upward than a normal direction of an open plane of the rear seat outlet. Accordingly, the air blown out from the rear seat outlet can be directed upward than the normal direction of the open plane of the rear seat outlet.

According to the eighth aspect, the vehicle air-conditioning apparatus includes an air diffusing member that diffuses the air blown out from the second passage in a width direction of the vehicle than the air blown out from the first passage. Accordingly, the air blown out from the second passage can be diffused in the vehicle width direction of the vehicle than the air blown out from the first passage.

According to the ninth aspect, a second air flow deflection member is disposed in the second passage adjacent to the rear seat outlet to diffuse the air blown from the rear seat outlet in the width direction of the vehicle. Accordingly, air blown out from the rear seat outlet through the second passage can be diffused in the vehicle width direction.

According to the tenth aspect, a third air flow deflection member is disposed in the first passage adjacent to the rear seat outlet to concentrate the air blown from the rear seat outlet to a center in the width direction of the vehicle. Accordingly, it is possible to concentrate the air blown out from the rear seat outlet through the first passage to the center in the vehicle width direction of the vehicle.

What is claimed is:

1. A vehicle air-conditioning apparatus comprising:
   an air conditioning unit configured to send air conditioned in temperature;
   a duct disposed in a seat of a vehicle, the air flowing through the duct from the air conditioning unit;
   a rear seat outlet formed on a back face of a backrest portion of the seat of the vehicle to blow out the air from the duct toward a rear seat of the vehicle; and
   an air flow deflection member that partitions the rear seat outlet into an upper first region and a lower second region to define a first passage through which the air flows from the duct through the first region in a first direction in a vehicle cabin and a second passage through which the air flows from the duct through the second region in a second direction more downward than the first direction in the vehicle cabin, wherein
   the air flow deflection member causes a flow of the air flowing out of the first region through the first passage and a flow of the air flowing out of the second region through the second passage in a switching manner,
   the duct has a section extending along an axial line in a region adjacent to a downstream end of the duct in the air flow,
   the air flow deflection member comprises a door body formed in a plate shape, and a rotation shaft disposed downstream of the door body in the air flow in the duct and arranged along one side of the door body in a plane direction,
   the first passage is closed by one side of the door body, and the second passage is closed by the other side of the door body, and
   an angle defined between the axial line and the door body when the first passage is closed by the one side of the door body is larger than an angle defined between the axial line and the door body when the second passage is closed by the other side of the door body.

2. The vehicle air-conditioning apparatus according to claim 1, wherein
   a wind speed of the air blown out from the first passage when the second passage is closed by the air flow deflection member is higher than a wind speed of the air blown out from the second passage when the first passage is closed by the air flow deflection member.

3. The vehicle air-conditioning apparatus according to claim 1, wherein a passage cross-sectional area of the first passage at the rear seat outlet is larger than a passage cross-sectional area of the second passage at the rear seat outlet.

4. The vehicle air-conditioning apparatus according to claim 1, wherein the axial line from an upstream side to a downstream side in the air flow in the duct is directed more upward than a normal direction of an open plane of the rear seat outlet.

5. The vehicle air-conditioning apparatus according to claim 1, further comprising an air diffusing member that diffuses the air blown out from the second passage in a width direction of the vehicle than the air blown out from the first passage.

6. The vehicle air-conditioning apparatus according to claim 5, wherein
   the air flow deflection member is a first air flow deflection member, and
   the air diffusing member includes a second air flow deflection member disposed in the second passage adjacent to the rear seat outlet to diffuse the air blown from the rear seat outlet in the width direction of the vehicle.

7. The vehicle air-conditioning apparatus according to claim 5, wherein
   the air flow deflection member is a first air flow deflection member, and
   the air diffusing member includes a third air flow deflection member disposed in the first passage adjacent to the rear seat outlet to concentrate the air blown from the rear seat outlet to a center in the width direction of the vehicle.

8. A vehicle air-conditioning apparatus comprising:
   an air conditioning unit configured to send air conditioned in temperature;
   a duct disposed in a seat of a vehicle, the air flowing through the duct from the air conditioning unit;
   a rear seat outlet formed on a back face of a backrest portion of the seat of the vehicle to blow out the air from the duct toward a rear seat of the vehicle; and
   an air flow deflection member that partitions the rear seat outlet into an upper first region and a lower second region to define a first passage through which the air flows from the duct through the first region in a first direction in a vehicle cabin and a second passage through which the air flows from the duct through the second region in a second direction more downward than the first direction in the vehicle cabin, wherein the air flow deflection member causes a flow of the air flowing out of the first region through the first passage and a flow of the air flowing out of the second region through the second passage in a switching manner, each of an upper opening edge portion of the rear seat outlet and a lower opening edge portion of the rear seat outlet is curved in a cross section perpendicular to a width direction of the vehicle, and a radius of curvature of the lower opening edge portion of the rear seat outlet is larger than a radius of curvature of the upper opening edge portion of the rear seat outlet.

9. The vehicle air-conditioning apparatus according to claim 8, wherein the duct has a section extending along an axial line in a region adjacent to a downstream end of the duct in the air flow, and the axial line from an upstream side to a downstream side in the air flow in the duct is directed more upward than a normal direction of an open plane of the rear seat outlet.

10. The vehicle air-conditioning apparatus according to claim 8, wherein the air flow deflection member closes one of the first passage and the second passage, and a wind speed of the air blown out from the first passage when the second passage is closed by the air flow deflection member is higher than a wind speed of the air blown out from the second passage when the first passage is closed by the air flow deflection member.

11. The vehicle air-conditioning apparatus according to claim 8, further comprising an air diffusing member that diffuses the air blown out from the second passage in a width direction of the vehicle than the air blown out from the first passage.

12. The vehicle air-conditioning apparatus according to claim 11, wherein the air flow deflection member is a first air flow deflection member, and the air diffusing member includes a second air flow deflection member disposed in the second passage adjacent to the rear seat outlet to diffuse the air blown from the rear seat outlet in the width direction of the vehicle.

13. The vehicle air-conditioning apparatus according to claim 11, wherein the air flow deflection member is a first air flow deflection member, and the air diffusing member includes a third air flow deflection member disposed in the first passage adjacent to the rear seat outlet to concentrate the air blown from the rear seat outlet to a center in the width direction of the vehicle.

14. The vehicle air-conditioning apparatus according to claim 8, wherein a passage cross-sectional area of the first passage at the rear seat outlet is larger than a passage cross-sectional area of the second passage at the rear seat outlet.

* * * * *